US011269600B2

(12) United States Patent
Koryakin (10) Patent No.: US 11,269,600 B2
(45) Date of Patent: Mar. 8, 2022

(54) SYSTEM AND METHOD OF ANALYSIS AND GENERATION OF NAVIGATION SCHEMA

(71) Applicant: Ingram Micro, Inc., Irvine, CA (US)

(72) Inventor: Rostislav Koryakin, Moscow (RU)

(73) Assignee: CloudBlue LLC, Irvine, CA (US)

(*) Notice: Subject to any disclaimer, the term of this patent is extended or adjusted under 35 U.S.C. 154(b) by 0 days.

(21) Appl. No.: 16/118,004

(22) Filed: Aug. 30, 2018

(65) Prior Publication Data

US 2020/0073642 A1 Mar. 5, 2020

(51) Int. Cl.
*G06F 8/38* (2018.01)
*G06F 16/954* (2019.01)
*H04L 67/562* (2022.01)
*G06F 9/451* (2018.01)

(52) U.S. Cl.
CPC .............. *G06F 8/38* (2013.01); *G06F 9/453* (2018.02); *G06F 16/954* (2019.01); *H04L 67/2809* (2013.01)

(58) Field of Classification Search
CPC .......... G06F 8/38; G06F 16/954; G06F 9/453; G06F 8/33; G06F 8/34; H04L 67/2809; H04L 67/10
See application file for complete search history.

(56) References Cited

U.S. PATENT DOCUMENTS

| | | | | |
|---|---|---|---|---|
| 6,904,452 B2* | 6/2005 | Sedky | ..................... | H04L 29/06 709/203 |
| 7,620,885 B2* | 11/2009 | Moulckers | ............ | G06F 40/131 715/201 |
| 8,924,269 B2* | 12/2014 | Seubert | ................... | G06Q 40/00 705/35 |
| 8,924,559 B2* | 12/2014 | Brown | ................... | G06Q 10/10 709/226 |
| 9,800,477 B2* | 10/2017 | Burton | ............... | H04L 41/5029 |
| 9,978,162 B1* | 5/2018 | Brett | ..................... | G06T 11/206 |
| 2003/0084153 A1* | 5/2003 | Sedky | ..................... | H04L 29/06 709/226 |
| 2006/0259499 A1* | 11/2006 | Moulckers | ........... | G06F 40/131 |
| 2008/0010534 A1* | 1/2008 | Athale | .................... | G06F 9/451 714/38.14 |
| 2009/0030902 A1* | 1/2009 | Aharoni | .................... | G06F 8/33 |
| 2011/0138047 A1* | 6/2011 | Brown | ................... | G06Q 10/10 709/226 |

(Continued)

OTHER PUBLICATIONS

Breiter, Gerd, and Vijay K. Naik. "A framework for controlling and managing hybrid cloud service integration." 2013 IEEE international conference on Cloud engineering (ic2e). IEEE, 2013. (Year: 2013).*

*Primary Examiner* — Matthew J Brophy
(74) *Attorney, Agent, or Firm* — Ice Miller LLP (57) ABSTRACT

The invention proposes a simpler and more efficient method for building a navigation schema in a cloud service broker platform (CSB) that builds a complex user interface (UI) from the CSB platform to an integrated connector application. The present disclosure automates navigation schema generation by obtaining a connector package, transforming a navigation schema therein from a hierarchical form to a plain form, and creating a modified schema for such. The present disclosure further discloses a method for creating a navigation schema template according to chosen placeholders and helps a user to fill in the template, and further check the created schema.

8 Claims, 10 Drawing Sheets

(56) References Cited

U.S. PATENT DOCUMENTS

| | | | |
|---|---|---|---|
| 2011/0154212 A1* | 6/2011 | Gharpure | G09B 21/009 715/738 |
| 2012/0137235 A1* | 5/2012 | T S | G06F 8/34 715/763 |
| 2013/0097521 A1* | 4/2013 | Lewin | G06T 15/005 715/744 |
| 2013/0318454 A1* | 11/2013 | Gilboa | G06Q 10/067 715/763 |
| 2014/0123020 A1* | 5/2014 | Bleier | G06F 8/38 715/746 |
| 2014/0379914 A1* | 12/2014 | Odenheimer | H04L 41/5041 709/225 |
| 2015/0026349 A1* | 1/2015 | Iyoob | G06F 8/60 709/226 |
| 2015/0370577 A1* | 12/2015 | Vishwanath | G06F 16/00 718/100 |
| 2016/0019636 A1* | 1/2016 | Adapalli | H04L 47/70 705/26.62 |
| 2016/0092499 A1* | 3/2016 | Leigh | G06F 8/34 707/740 |
| 2016/0105475 A1* | 4/2016 | Goodman | G06F 3/04845 715/753 |
| 2016/0328101 A1* | 11/2016 | Goodman | G06F 3/016 |
| 2017/0123632 A1* | 5/2017 | Latzina | G06F 40/169 |
| 2017/0177183 A1* | 6/2017 | Ritter | G06F 3/0484 |
| 2017/0178525 A1* | 6/2017 | Kwan | G09B 5/06 |
| 2017/0235466 A1* | 8/2017 | Tanwir | G06F 9/451 715/738 |
| 2017/0235713 A1* | 8/2017 | Martensson | G06F 40/174 715/221 |
| 2017/0364046 A1* | 12/2017 | Westrick, Jr | H04L 12/283 |
| 2018/0107343 A1* | 4/2018 | Mills | G06F 8/316 |
| 2018/0108274 A1* | 4/2018 | Gharpure | G09B 21/00 |
| 2018/0189076 A1* | 7/2018 | Liston | G06F 21/00 |
| 2018/0191718 A1* | 7/2018 | Kuzkin | H04L 63/0884 |
| 2018/0192117 A1* | 7/2018 | Liston | H04H 60/46 |
| 2018/0203571 A1* | 7/2018 | Dayanandan | G06T 7/73 |
| 2018/0212791 A1* | 7/2018 | Garg | H04M 1/72415 |
| 2018/0275971 A1* | 9/2018 | Parsolano, III | G06F 8/35 |
| 2018/0299851 A1* | 10/2018 | Westrick, Jr | H04L 12/283 |
| 2018/0349730 A1* | 12/2018 | Dixon | G06K 9/6262 |
| 2019/0034957 A1* | 1/2019 | Koryakin | G06F 11/3668 |
| 2019/0042581 A1* | 2/2019 | Aylett | G06F 16/211 |
| 2019/0250891 A1* | 8/2019 | Kumar | G06N 3/0454 |
| 2019/0265982 A1* | 8/2019 | Mickelsson | H04L 41/0213 |
| 2019/0286458 A1* | 9/2019 | Koryakin | G06N 7/005 |

\* cited by examiner

SYSTEM AND METHOD OF ANALYSIS AND GENERATION OF NAVIGATION SCHEMA

TECHNICAL FIELD

This invention relates to a system and method for user interfaces (UI), and more particularly, to system and method of analysis and generation of navigation schema for integrating cloud applications' UI.

BACKGROUND

Cloud service brokers (CSB) provide a way for independent software vendors (ISV) to distribute cloud services through a CSB platform and allow different cloud applications to collaborate through standardized RESTful application programming interfaces (API). In order for ISVs to integrate their applications with CSB platform, a connector package must be created for each cloud application.

The connector package usually has the form of an archive file that typically includes metadata, control method descriptions, and content files, which are usable to declare and define the application resources, services, user interface components, and logic of control methods necessary for managing resources, applicable to the cloud application. It will be appreciated that a connector package consists of the declarative files used to define the ISV's application resources and of the "connector frontend"—the web-interface that CSB's customers see in a CSB interface. This web-interface is developed by the connector package developers using a special framework, which may include widgets, predefined page structure, navigation methods and screen insertion mechanism. A typical connector frontend consists of screens inserted into predefined views, custom logic for rendering widgets and custom navigation structure. The widgets may display information that connector developer considers to be valuable for the customer of the corresponding cloud application. By way of examples, usage reporting, subscription and service information, and instructions, may be information applicable to a user of a particular cloud application.

During the integration installation process the connector package is converted into the connector application, to activate an instance of that connector package. This integration method allows for the management of several cloud applications through single web panel with common style and collection of controls. At the same time, capabilities of integrated UI are developed enough to implement a wide set of client business logic for cloud applications. This integration method is known as UI navigation. In other words, the CSB platform integrates its own platform UI with UI of integrated applications, and can then be presented to CSB platform client in several ways.

Figure 1A:
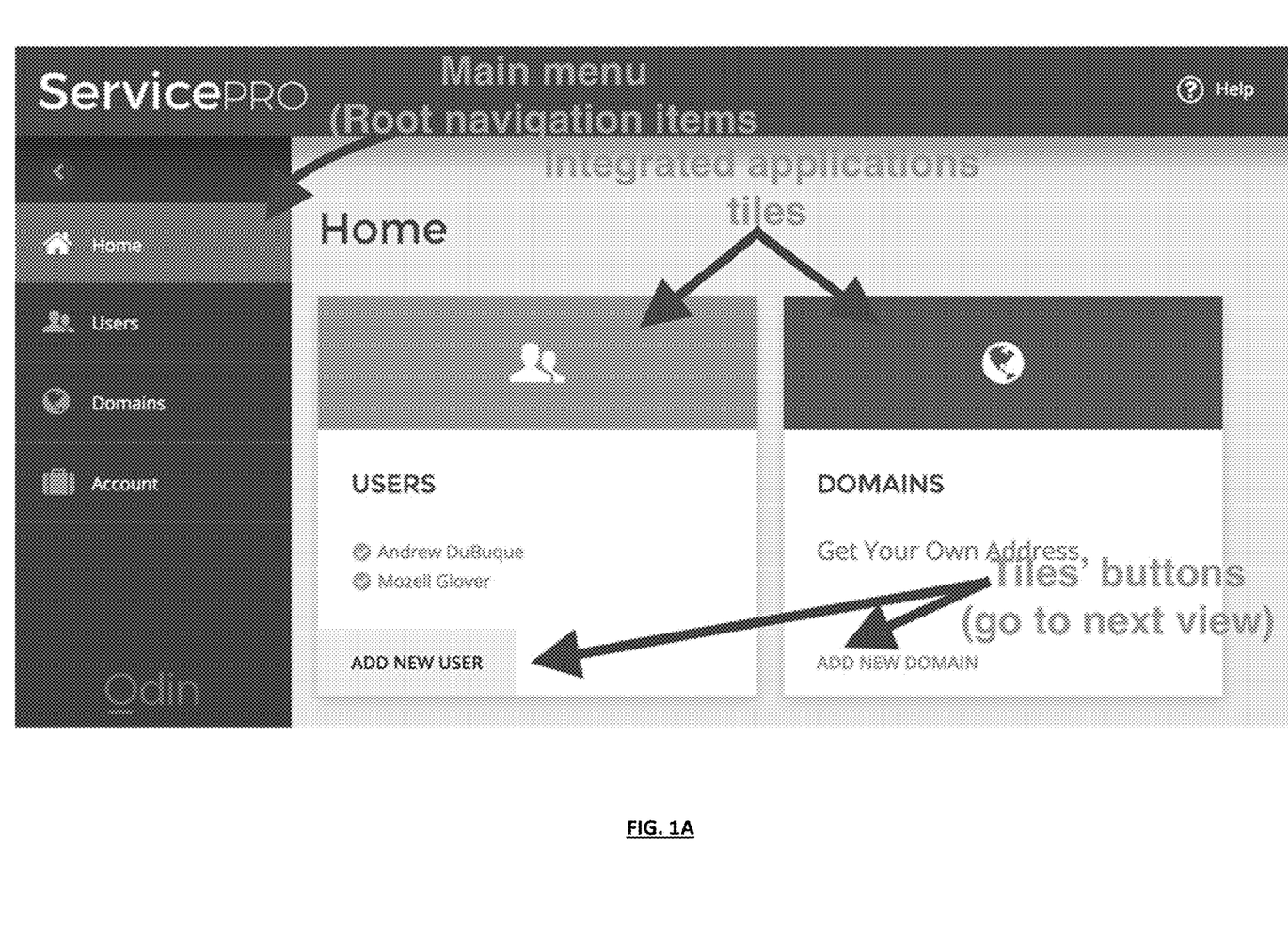
FIG. 1A displays a cloud service broker customer's control panel, via a graphical user interface.
Figure 1B:
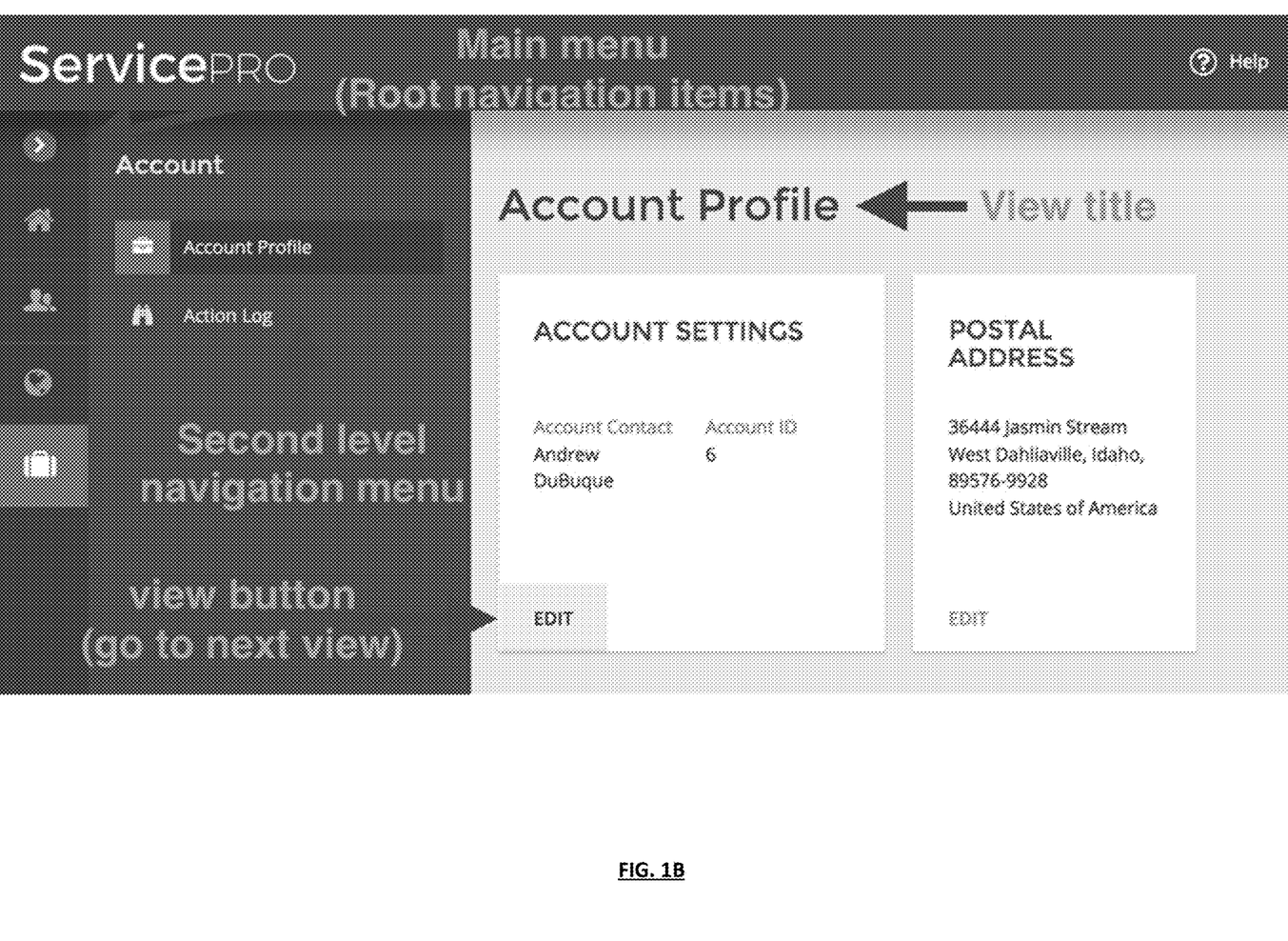
FIG. 1B displays a cloud service broker customer's control panel, via a graphical user interface.

By way of examples, FIG. 1A, and FIG. 1B are screenshots of the CSB platform's customer panel (CP). On both screenshot, there is a main navigation menu (root navigation items) which contains items: "Home," "Users," "Domains," and "Account." All these elements are owned by connector applications and integrated into the CSB control panel. Each integrated item contains buttons, tiles, icons and a variety of other controls. Some of controls can perform transition to another view on demand. View is a screen which is able to interact with user, such as, for example, showing useful information, change any user's settings, resources, or navigate to another view.

Figure 1C:
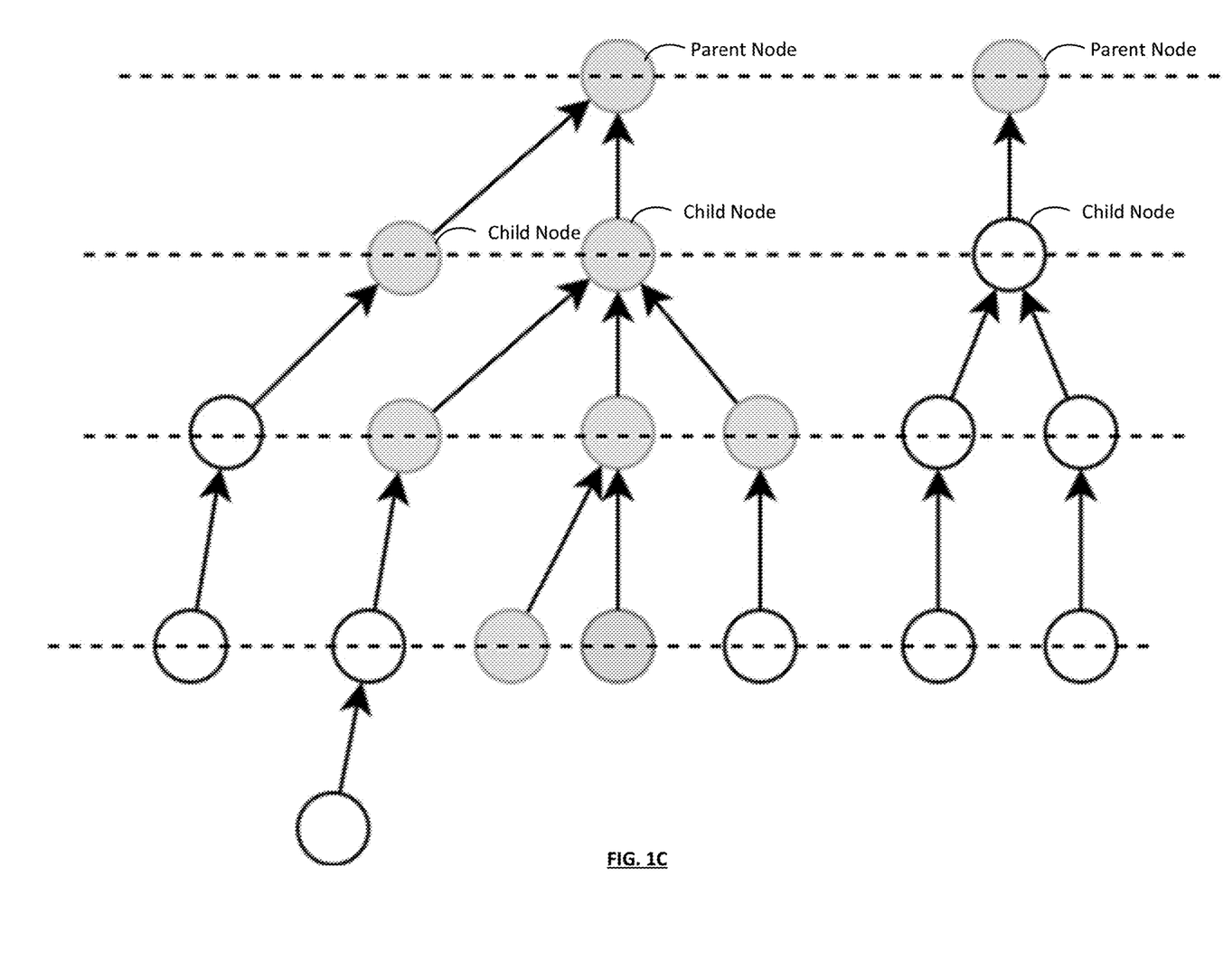
FIG. 1C displays a dynamic tree view of a user interface navigation response.
Figure 1D:
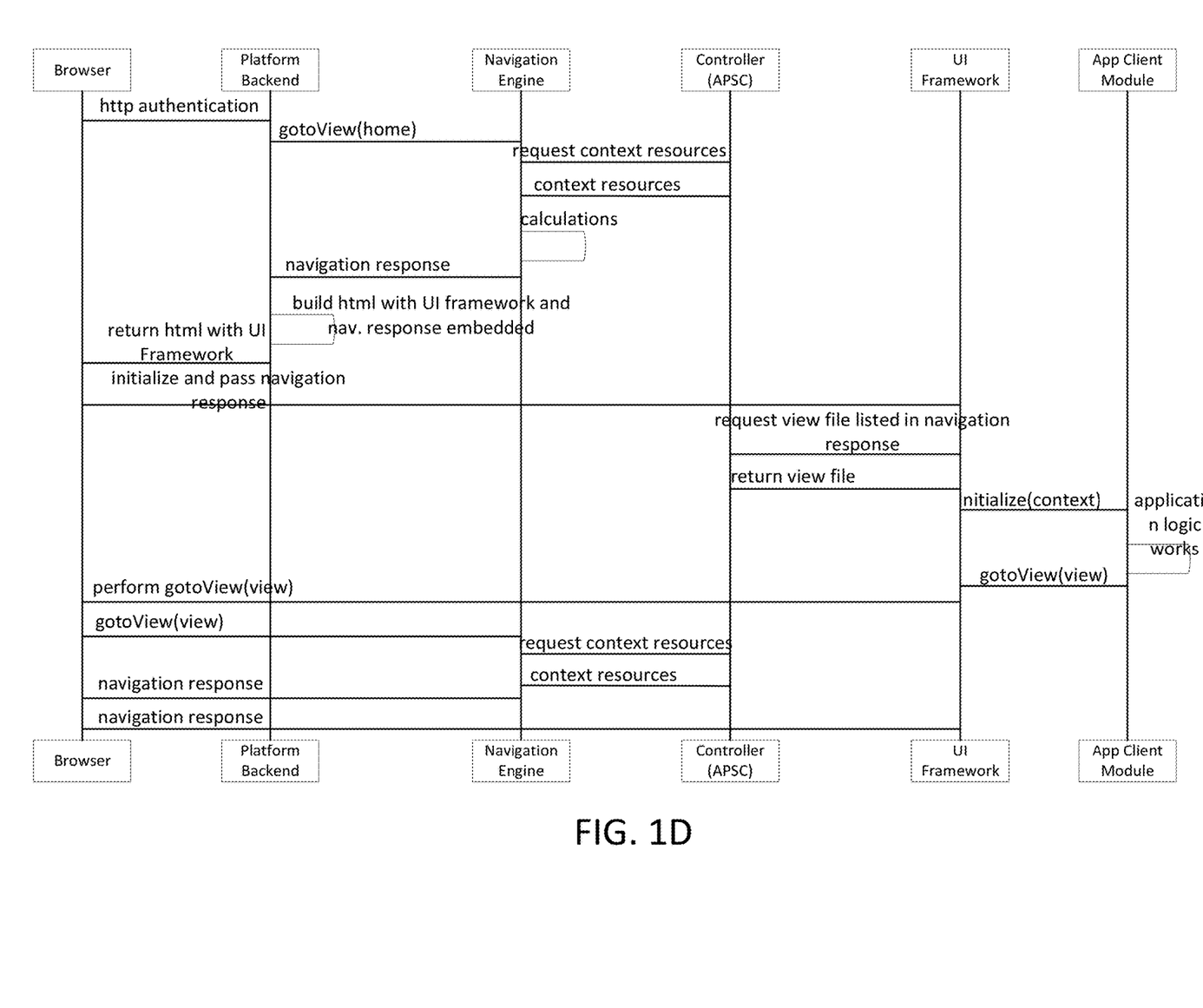
FIG. 1D displays a sequence flow of navigation response from a browser to a CSB backend.

In such traditional embodiment, UI navigation is a tree of views, where the navigation tree forms a hierarchy. In such an embodiment, top level menu items are called root elements. Each element as node of a tree can have several leaves (children elements). This hierarchy has three purposes: (1) Two highest level of elements form the menu in the customer's panel; (2) Path from a top element of tree to any descendant forms a possible user's navigation path; and (3) Path from a top element of tree to any descendant forms context (will be described later). An embodiment of this traditional hierarchy is shown in FIG. 1C In a traditional CSB platform implementation, a request for navigation is initiated from a user's browser to the CSB platform backend, which transmits the request to a navigation engine, to a CSB controller, to a UI framework, and to an APP client module. The each of the components plays a role in the UI response, as shown in FIG. 1D.

As shown above, the traditional method requires significant amounts of upfront work to orchestrate a proper navigation UI, but also significant computing resources to work during execution. In addition, during execution, there is an increased likelihood of slow response times given that the navigation engine will have to access numerous resources in order to perform the navigation.

Therefore, there is a need from an improved system and method of analysis and generation of navigation schema

SUMMARY

The present disclosure relates to a method for analysis of navigation schema, including checking for a transformation request, checking a navigation schema, initializing a plurality of navigation elements, the each of the navigation elements having a variable context associated therewith, saving the each of the variable context for each of the plurality of navigation elements to a map, moving the each of the plurality of navigation elements to a plain navigation schema, and integrating the each of the plurality of navigation elements to a root placeholder.

In at least one embodiment of the present disclosure, the method further includes the step of placing the context variables of the each of the plurality of navigation elements in the plain navigation schema, and the step of checking if the map is empty.

In at least one embodiment of the present disclosure, a method of general of a navigation schema is provided, the method includes creating, at a navigation schema analyzer, an empty navigation schema, using a navigation object model, retrieving a corresponding schema template from a template library and inserting the corresponding schema template into the empty navigation schema, generating, at the navigation schema analyzer, a generated schema comprising at least one navigation element selected from a group consisting of a menu level, a view, a wizard, and a label, analyzing, at the navigation schema analyzer, the generated schema, and completing, at the navigation schema analyzer, a connector package based at least in part on the generated schema, and publishing the connector package.

In at least one embodiment of the present disclosure, a system for analysis and generation of navigation schema is provided, including a developer computing device operably connected to a marketplace computing device, wherein, the developer computing device further comprises a navigation schema analyzer operably connected to a resource type manager, and wherein, the developer computing device further comprises a developer portal user interface (UI), operably connected to the navigation schema analyzer.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

This detailed description is presented in terms of programs, data structures or procedures executed on a computer or network of computers. The software programs implemented by the system may be written in any programming language—interpreted, compiled, or otherwise. These languages may include, but are not limited to, Xcode, iOS, cocoa, cocoa touch, MacRuby, PHP, ASP.net, HTML, HTML5, Ruby, Perl, Java, Python, C++, C#, JavaScript, and/or the Go programming language. It should be appreciated, of course, that one of skill in the art will appreciate that other languages may be used instead, or in combination with the foregoing and that web and/or mobile application frameworks may also be used, such as, for example, Ruby on Rails, System.js, Zend, Symfony, Revel, Django, Struts, Spring, Play, Jo, Twitter Bootstrap and others. It should further be appreciated that the systems and methods disclosed herein may be embodied in software-as-a-service available over a computer network, such as, for example, the Internet. Further, the present disclosure may enable web services, application programming interfaces and/or service-oriented architecture through one or more application programming interfaces or otherwise.

DEFINITIONS: All the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning. In any cases, even the terms defined in this specification cannot be interpreted as excluding embodiments of the present disclosure.

Cloud Service Broker Platform—a platform which has relationships with several ISV and provide a way to sell their services among platform customers with the help of connector packages.

The connector package—software unit, set of classes, procedures and functions intended to translate vendor entities and API terms into a CSB Platform terms.

Connector application—an active instance of connector package installed on the CSB platform.

View—a logical element of connector's frontend representing single UI screen. Contains such UI controls as tiles, buttons, combo-boxes etc.

CSB Customer Panel—a hierarchically structured set of CSB Platform and connector application views divided into menu levels.

CSB platform backend—set of classes, procedures and functions intended to integrate UI Framework—set of CSB Platform classes, procedures and functions which encapsulate CSB Platform internals from Connector application interface code.

Connector frontend—a web-interface provided by connector developers which operates ISV entities by means of CSB Platform.

Navigation schema (Navigation tree)—persisted or in-memory representation of Connector application available views, their hierarchy and contexts, rules of transitions between them.

Navigation request—transition request with particular view as a target.

Navigation response—response containing information about availability of particular view, visibility, context and menu items.

Navigation placeholder—an integration point, element of navigation tree intended for substitution of another tree.

Resource type—abstraction which designates belongings of resource instances to the common or separate inheritance chains. In addition, resource type defines set of attributes and properties.

Resource—Instantiated resource type. Contains attributes and properties shared with all instances of the type, but independent values.

Type hierarchy—order relationship between types. Resources can have a common type or inherited types or independent types as it works in object-oriented programming.

Navigation variable—node in navigation schema and navigation tree which defines views context and visibility conditions. Every variable corresponds to some set of resources defined by variable filters.

Context—set of resources which are declared by connector developers as required for displaying particular navigation sub-tree.

Variable scope—contribution of a single variable to context, set of resources satisfying variable filters.

Variable resolution—process of retrieving resources included to variable scope.

Figure 2:
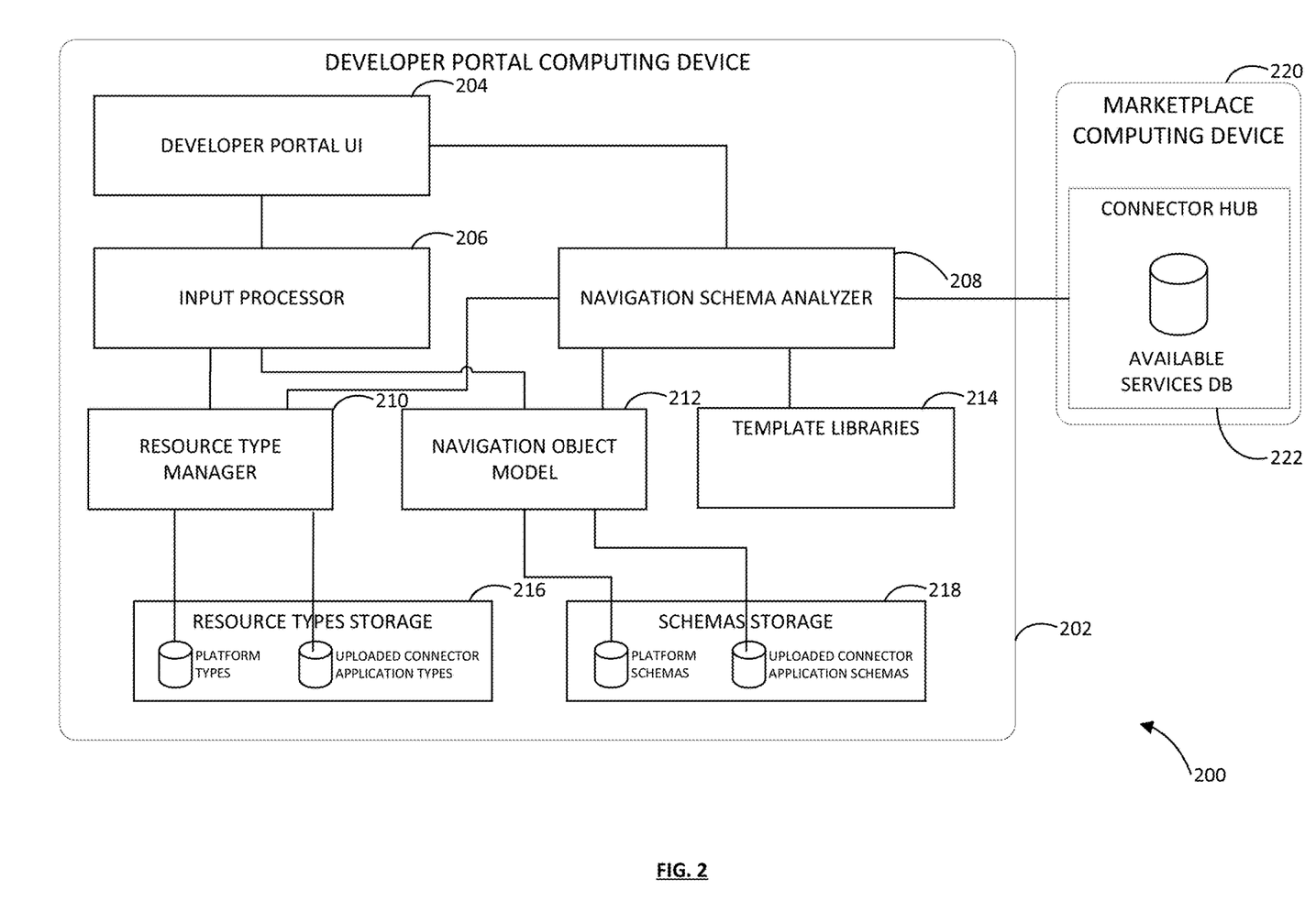
FIG. 2 displays a system for analysis and general of a navigation schema, according to at least one embodiment of the present disclosure.

FIG. 2 is a schematic drawing of a system analysis and generation of navigation schema for integrating cloud applications' UI, generally indicated at 200. The system includes a developer portal computing device 202, developer portal UI 204, input processor 206, navigation schema analyzer 208, resource type manager 210, navigation object model 212, template libraries 214, resource types storage 216, schema storage 218, marketplace computing device 220, and connector hub 222. For purposes of clarity, only one of each component type is shown in FIG. 2. However, it is within the scope of the present disclosure, and it will be appreciated by those of ordinary skill in the art, that the system 200 may have two or more of any of the components shown in the system 200, including the developer portal computing device 202, and marketplace computing device 220.

In at least one embodiment of the present disclosure, the developer portal UI 204 is configured to provide controls for a user to upload connector package(s), download modified package(s), and create, edit and analyze navigation schemas.

In at least one embodiment of the present disclosure, the input processor 206 is configured to unpack connector package(s), retrieves resource types from the resource type manager 210, as further disclosed below. The input processor 206 is further configured to process and load the resource types, and retrieve navigation schema from the navigation object model 212, as further disclosed below.

In at least one embodiment of the present disclosure, the navigation schema analyzer 208 is configured to perform all operations requested by user, such as, for example, generate navigation schemas, and make existing navigation schemas plain. In at least one embodiment of the present disclosure, the navigation schema analyzer 208 is operably connected to configured resource type manager 210, navigation object model 212, and template libraries 214, as would be well known to one having ordinary skill in the arts. It will be appreciated that the output of the navigation schema analyzer 208 may include (as further disclosed below) the list of warnings or errors, modified navigation schema, created navigation schema, or modified connector package to download, to name a few, non-limiting examples.

In at least one embodiment of the present disclosure, the resource type manager 210 is configured to keep and analyze connector resource types and their hierarchy. It will be appreciated that this is necessary to detect intersecting type inheritance chains or wide variable declarations that are too wide. In at least one embodiment of the present disclosure, common interfaces of the resource type manager 210 provides the ability to get a list of all resource types, checking if type A inherits type B, getting common parent type for type A and B, getting inheritance chain length for type A, to name a few, non-limiting examples. In navigation schema generation mode, the resource type manager 210 is further configured to show to the user the list of platform resource types.

In at least one embodiment of the present disclosure, the navigation object model 212 encapsulates low-level XML representations and exposes high level methods to manipulate and explore the tree. It further contains an internal representation of the navigation schema in terms of objects and links between them. This representation is simpler to work with, because it is described in specialized terms. This representation is faster than XML because XML parsing is performed only once. In at least one embodiment of the present disclosure, the navigation schema analyzer 208 is configured so that the navigation object model 212 can be used to check schema for validity, redundant hierarchy levels, loops, repeating elements, redundant variables placed with the same filters on different levels of hierarchy, incorrect or redundant filters with too wide or too narrow limits. In navigation schema generation mode, navigation schema analyzer 208 suggests templates for navigation elements using navigation object model 212 and schemas storage 218 to the user and pastes them in the generated navigation schema upon request.

Figure 3:
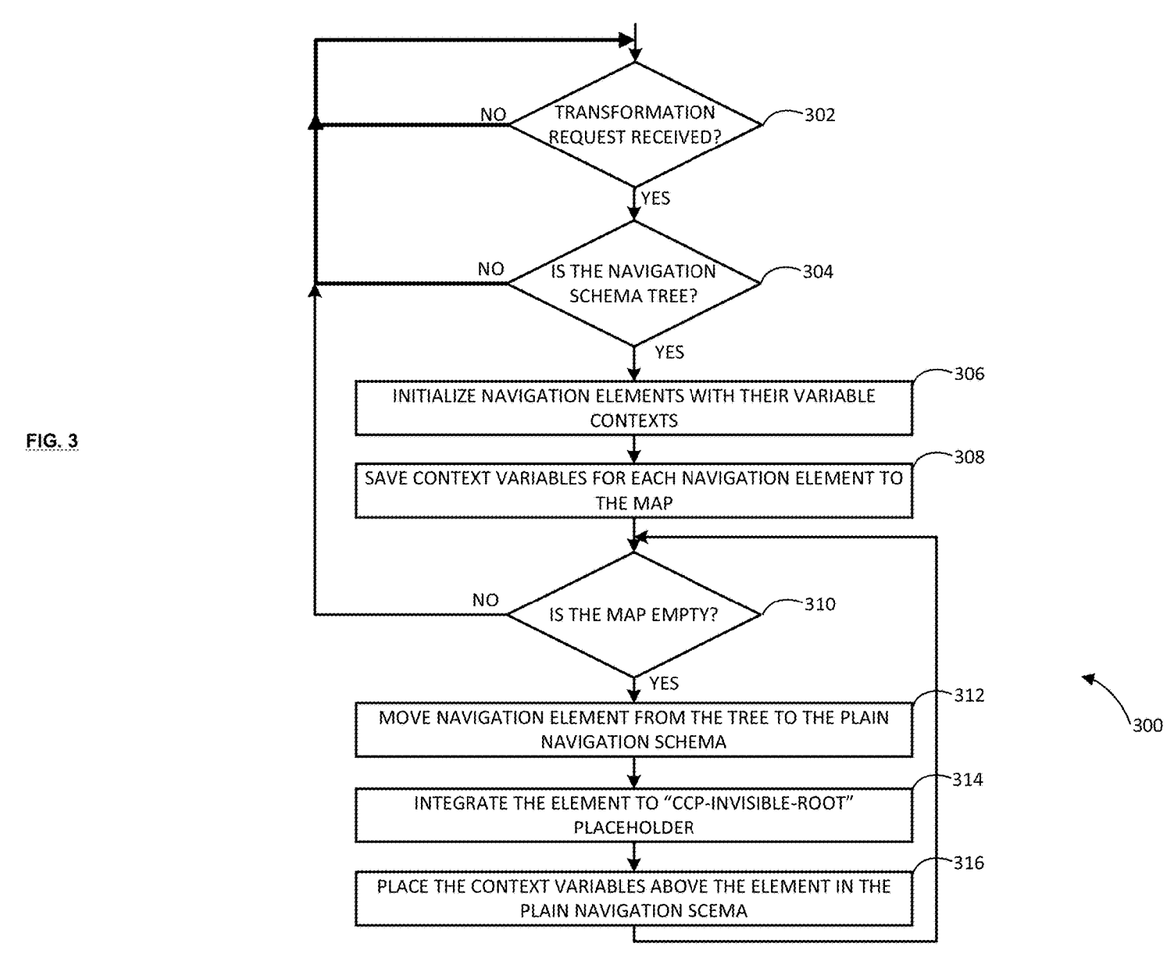
FIG. 3 displays a method for analysis and general of a navigation schema, according to at least one embodiment of the present disclosure.

Referring now to FIG. 3, there is shown a method to transform a hierarchical UI navigation schema to a plain schema uniquely, generally indicated at 300. In at least one embodiment of the present disclosure, the method 300 includes checking for a transformation request at step 302, checking the navigation schema at step 304, initializing navigation elements at step 306, saving context variables at step 308, checking the map at step 310, moving navigation elements at step 312, integrating elements at step 314, and placing context variables at step 316.

In at least one embodiment of the present disclosure, a scenario starts form the uploading of an existing connector package via the developer portal UI 204, and checks to see if a transformation request is received, at step 302. In at least one embodiment of the present disclosure, the input processor 206 unpacks the connector package, retrieves resource types and requests from the resource type manager 210, that processes and loads them.

In at least one embodiment of the present disclosure, the navigation schema analyzer 208 and navigation object model 212 are configured to check if there is a navigation schema tree. The method 300 then proceeds to step 306 where the navigation schema analyzer 208 and navigation object model 212 initialize navigation elements with their variable contexts. The method 300 then proceeds to step 308 where the navigation schema analyzer 208 is configured to save context variables for each navigation element to the map.

In at least one embodiment of the present disclosure, the method 300 then proceeds to step 310, where the navigation schema analyzer 208 configured to check if the map is empty. If the map is empty, the method 300 proceeds to step 312 where the navigation schema analyzer 208 and navigation object model 212 move navigation elements form the tree to the plain navigation schema. In at least one embodiment of the present disclosure, the navigation schema analyzer 208 and navigation object model 212 are further configured to integrate the element to a placeholder, at step 314. The method 300 then proceeds to step 316 where the navigation schema analyzer 208 and navigation object model 212 are configured to place the context variables above the element in the plain navigation schema.

By way of an example, a multicontext view may be coded as follows:

```
<application packaged="2016-07-20T15:20:58" version="2.0" xmlns="http://aps-standard.org/ns/2">
    <!-- ... -->
    <presentation>
        <navigation id="sample-vps">
            <plugs-to id="cp"/>
            <view id="vps" src="vps.js">
                <var name="server" type-id="http://www.aps-standard.org/vps/1.0"
                    filter="eq(active,true)" required="true"/>
                <view id="backup-servers" src="bks.js">
```

```xml
                <var name="backup-servers" type-id "http://www.aps-
standard.org/bserver/1.0" required="true"/>
                                <view id="backup-list" src="backup-list.js">
                                    <var name="backups" type-
id="http://www.aps-standard.org/backup/1.0" required="true"
                                        collection="true"/>
                                </view>
                            </view>
                        </view>
                    </navigation>
                </presentation>
</application>
    <application packaged="2016-07-20T15:20:58" version="2.0" xmlns=" http://aps-standard.org/ns/2">
        <!-- ... -->
        <presentation>
            <navigation id="sample-vps">
                <plugs-to id="cp"/>
                <view id="vps" src="vps.js">
                    <var name="server" type-id=" http://www.aps-standard.org/vps/1.0"
                        filter="eq(active,true)" required="true"/>
                    <view id="backup-servers" src="bks.js">
                        <var     name="backup-servers"     type-id="http://www.aps-
standard.org/bserver/1.0" required="true"/>
                        <view id="backup-list" src="backup-list.js">
                            <var     name="backups"     type-id="http://www.aps-
standard.org/backup/1.0" required="true"
                                collection="true"/>
                        </view>
                    </view>
                </view>
            </navigation>
        </presentation>
</application>
```

In the foregoing multicontext view example, the context contains several variables. The application name here is 'VPS' with service 'VPS'. The VPS service may have backups, which backups are stored on backup servers. Every backup server can store backups from a different VPS. Continuing with the above example, a view with ID 'VPS' is a dashboard of VPS server(s) that contains links to backup-server associated with the VPS server. The context for the 'VPS' view here is only the VPS variable. Context of backup-servers view is the 'VPS' variable and 'backup-servers' variable. In addition, there is a third level of hierarchy—variable 'backup list'. A user can navigate from the view of backup-server to the list of backups for that particular VPS. The third level context is a union of VPS, backup-server and backups list. Here the backups list should be presented as a list of backups stored on the backup-server for particular VPS. In the above example, the UI navigation should resolve three contexts to perform the needed visibility calculations.

Continuing with the above example, the above UI navigation schema can be transformed to a plain schema uniquely (via method 200), and as shown below:

```xml
<application packaged="2016-07-20T15:20:58" version="2.0" zmlns="http://aps-
standard.org/ns/2">
    <!-- ... -->
    <presentation>
        <navigation id="sample-vps">
            <plugs-to id="cp" />
            <view id="vps" src="vps. js">
                <var name="server" type-id="http://www.aps-
standard.org/vps/1.0"
                    filter="eq(active,true)" required="true" />
            </view>
        </navigation>
        <navigation id="other-screens">
            <plugs-to id="ccp-invisible-root" />
            <view id="backup-servers" src="bks. js">
                <var name="server" type-id="http://www.aps-
standard.org/vps/1.0"
                    filter="eq(active,true)" required="true" />
                <var name="backup-servers" type-id="http://www.aps-
standard.org/bserver/1.0" required="true" />
            </view>
            <view id="backup-list" src="backup-list. js">
                <var name="server" type-id="http://www.aps-
standard.org/vps/1.0"
                    filter="eq(active,true) " required="true" />
                <var name="backup-servers" type-id="http://www.aps-
standard.org/bserver/1.0" required="true" />
```

```
    <var name="backups" type-id="http://www.aps-
standard.org/backup/1.0" required="true" collection="true" />
       </view>
    </navigation>
  </presentation>
</application>
```

As shown in the foregoing transformed plain schema, the method 200 of transformation allows for the development of a connector application's navigation schema without using a hierarchy. It will be appreciated that there is no need to track all levels of contexts above a certain variable.

Continuing with the example above, the foregoing transformed plain schema shows that each view now contains the exact necessary number of variables. As shown, view "backup-list" declares three variables explicitly, and it is impossible to jump to each, without providing three context items. It will be appreciated that context variable resolution is much simpler in this case. Each context is plain, and there are no iterations over context elements for collecting needed information for resolving the variables referring to the element. In the user interface, the steps of moving into backups list will now present as: (1) Open panel, click on VPS page root menu item; (2) Click on backup servers of VPS, where gotoView is done with setting double context. It will be appreciated that no passing up towards the navigation root is required here, and target-view is integrated into the visible root. Only variables placed under target view will be calculated. (3) Click on some backup server from the list. Here gotoView is done with setting triple context. Again: no passes up and down through the tree are performed. Only three variables from the exact context are evaluated.

It will be further appreciated that context variable resolution is much simpler in this transformed case.

Figure 4:
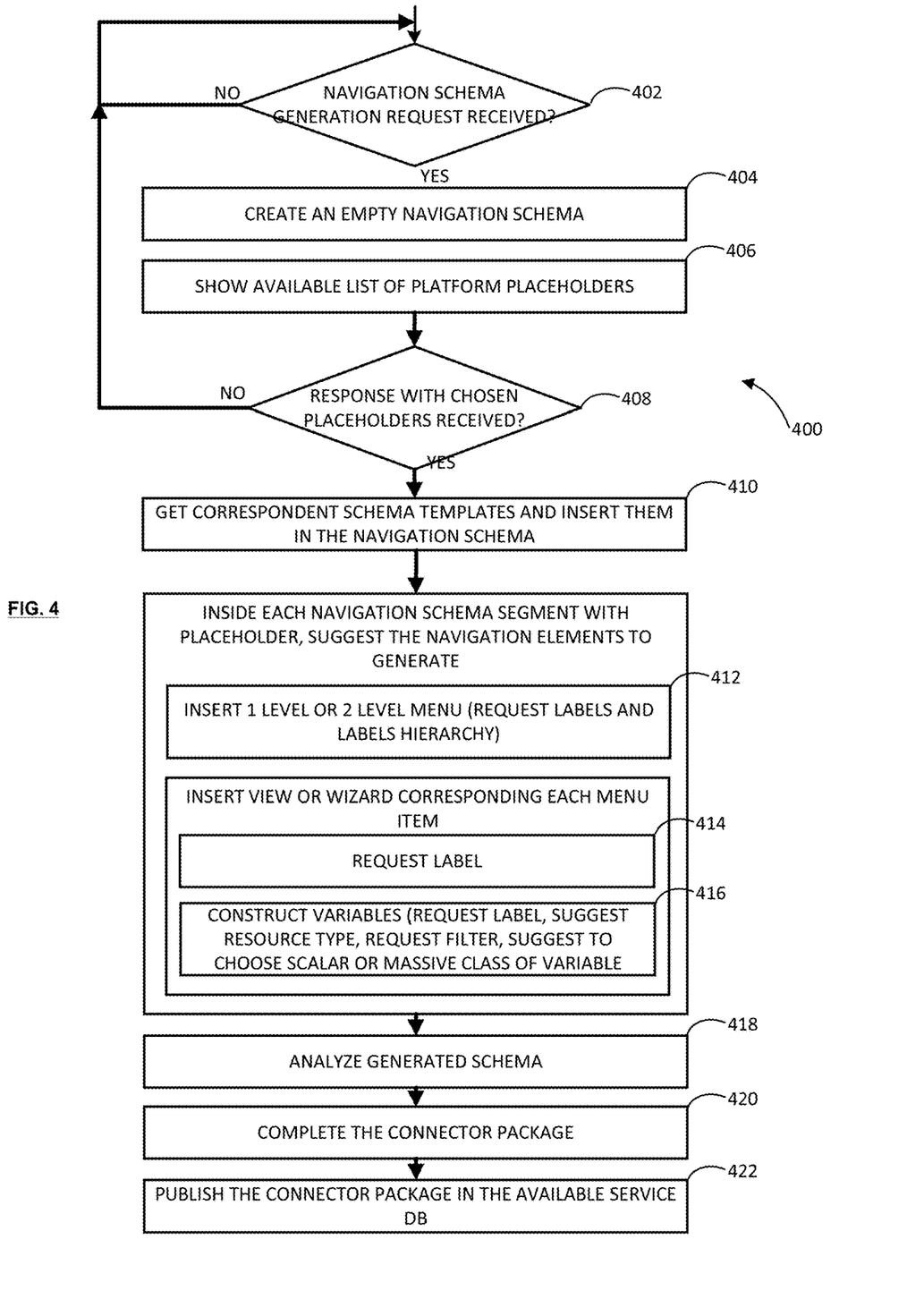
FIG. 4 displays a method for analysis and general of a navigation schema, according to at least one embodiment of the present disclosure.

Referring now to FIG. 4, there is shown a method 400 for navigation schema autogeneration, according to at least one embodiment of the present disclosure. The method 400 includes, checking if a navigation schema general request is received at step 402, creating an empty navigation schema at step 404, showing available list of platform placeholders at step 406, checking if a response with chosen placeholders is received at step 408, getting correspondence schema templates and inserting them in the navigation schema at step 410, inserting first and second level menu items at step 412, requesting a label at step 414, constructing variables at step 416, analyzing generated schema at step 418, completing the connector package at step 420, and publishing the connector package in the available service database at step 422.

In at least one embodiment of the present disclosure, the input processor 206 is configured to check if a navigation schema general request is received at step 402. The method 400 then proceeds to step 404 where the navigation schema analyzer 208 and the navigation object model 212 are configured to create an empty navigation schema. The method then proceeds to step 406 where the navigation schema analyzer 208 is configured to create platform placeholders, and displayed via the developer portal UI 204.

In at least one embodiment of the present disclosure, the method 400 then proceeds to step 408 where the developer portal UI 204 is configured to receive and check is a response with chosen placeholders is received. If received, the method 400 proceeds to step 410; if not received, the method 400 reverts to step 402.

In at least one embodiment of the present disclosure, the navigation schema analyzer 208 is configured to get corresponding schema templates from the template libraries 214, and insert them into the navigation schema, at step 410.

The method 400 then proceeds to step 412 where the navigation schema analyzer 208 inserts level menu with using the navigation object model 212, via the developer portal UI 204 to show changes and request labels.

The method 400 then proceeds to step 414 where the navigation schema analyzer 208 inserts views using the navigation object model 212, via the developer portal UI 204 to show changes and request labels. The method 400 then proceeds to step 416 where the navigation schema analyzer 208 inserts level menu with using the navigation object model 212, via the developer portal UI 204 to show changes and request labels. The method then proceeds to step 418 where the navigation schema analyzer 208 is configured to use the navigation object model 212 to bypass and analyze the tree and schema using the resource type manager 210.

The method 400 then proceeds to step 420 where the navigation schema analyzer 208 completest the connector package and then publishes the connector package at step 422, via the connector hub 222.

Figure 5A:
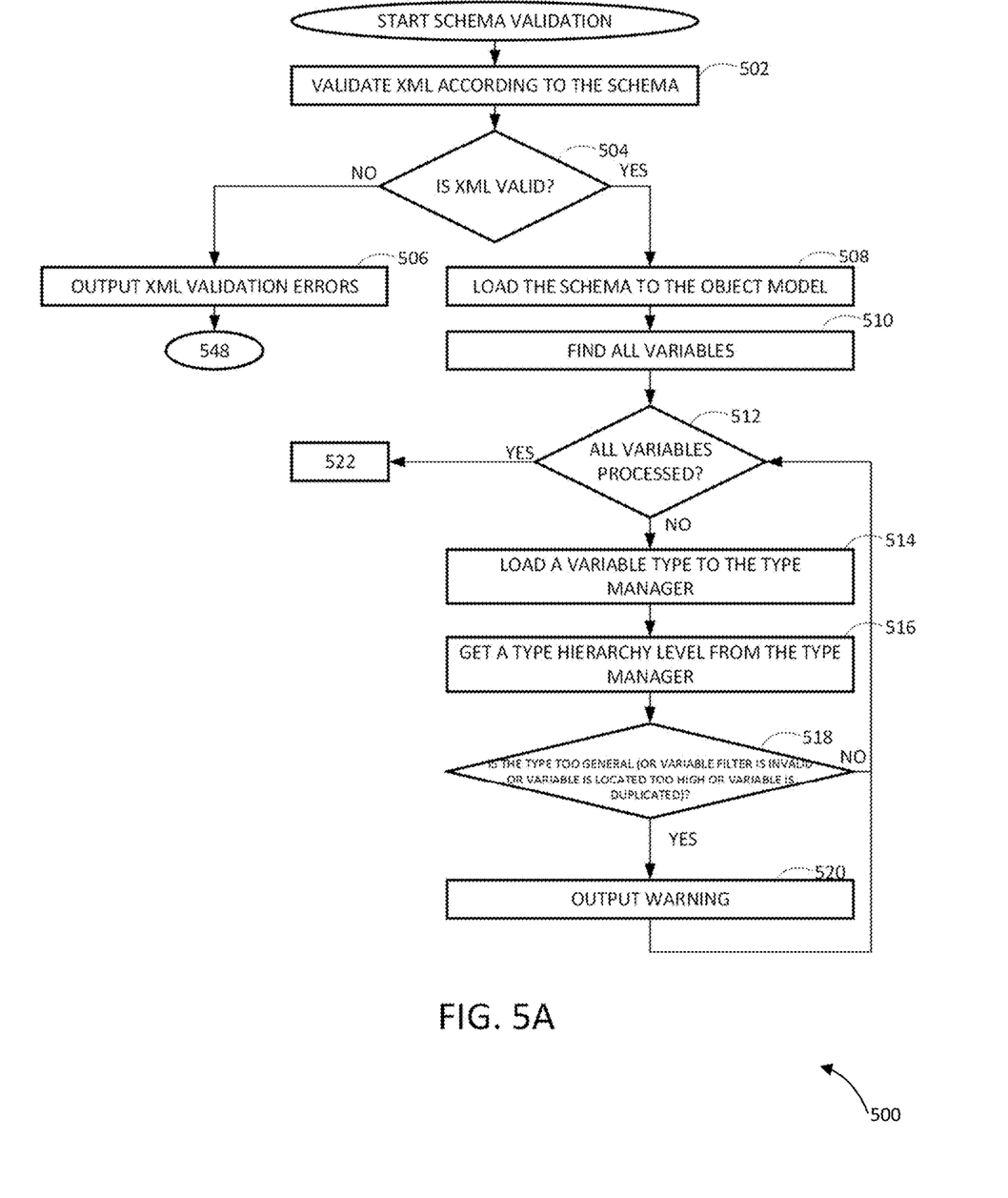
FIG. 5A displays a method for analysis and general of a navigation schema, according to at least one embodiment of the present disclosure.
Figure 5B:
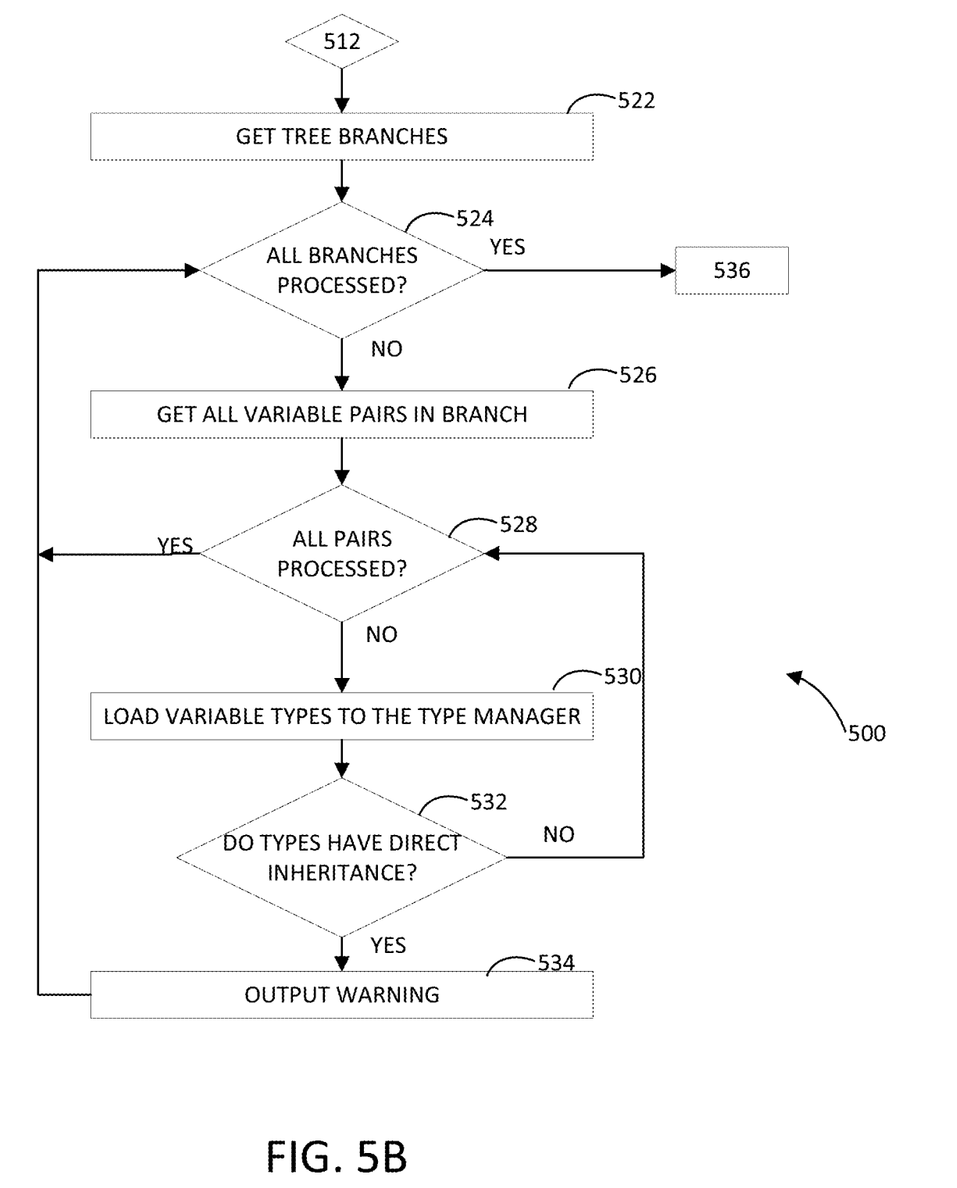
FIG. 5B displays a method for analysis and general of a navigation schema, according to at least one embodiment of the present disclosure.
Figure 5C:
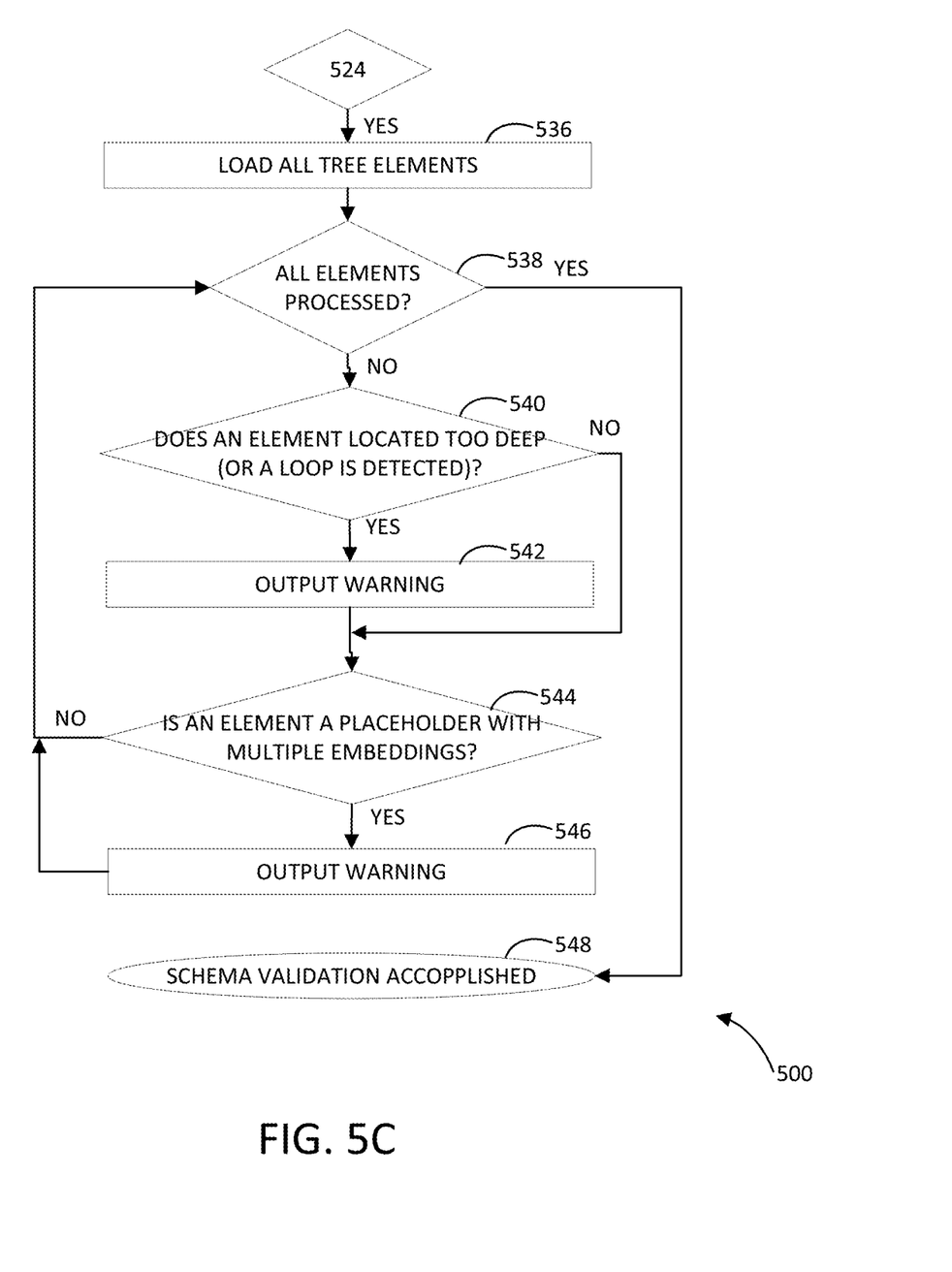
FIG. 5C displays a method for analysis and general of a navigation schema, according to at least one embodiment of the present disclosure.

Referring now to FIGS. 5A, 5B and 5C there is shown a method 500 for navigation schema analysis, according to at least one embodiment of the present disclosure. The method 500 includes validating the XML file of the navigation schema with standard XML validator at step 502. It will be appreciated that it is low-level check at step 504, and it will filter files with nonexistent tags, incorrect attribute names, and the like. If the XML is not valid, validation errors are output at step 506 and the method 500 terminates.

Otherwise, the method 500 then proceeds to step 508 where the method begins the conversion of the XML file to the navigation object model. All subsequent steps will be performed calling the object model, as further disclosed herein. In at least one embodiment of the present disclosure, the method 500 loads the schema to the object model at step 508, a loads the list of variables in the schema, at step 510. In at least one embodiment of the present disclosure, the resource type manager 210 is initialized to check "type-id" attribute of every variable, to ensure that it contains existing platform type, such as, for example, an APS type.

The method 500 then proceeds to step 512 to check if all variables are processed. In at least one embodiment of the present disclosure, if there are variables that require processing, the method proceeds to step 514 where for every variable in the schema a check is made to confirm if the variable is of a general type without sufficient specificity (i.e. if the variable is too general, whereby variable attribute "type-id" is too general type, which means this type is descendant for a lot of other types, like "aps-resource" or "counter" or "user"). At step 516, the method 500 gets the hierarchy type from the resource type manager 210.

It will be appreciated that for every variable in the schema, a check is also made for variable scope size (amount of views under the variable). If the scope is too large (variable is located too high) a warning message is output (at step 520). Similarly, for every duplicated variable, a warning is output; for every view, a warning is output if the view is located too deep (unreasonable depth of the tree); for every view, a view's context size is checked and a warning output if the context is too large (complicated context warning); for every view, a bypass of all the variable from the view's context is checked. It will be further appreciated that a warning is output if there is any pair of variables such that "type-id" attributes of them are in direct inheritance relationships (one type is parent for another).

The method 500 then proceeds to step 522 where tree branches are retrieved. A check is performed at step 524 to see if all branches are processed. If they are, the method proceeds to step 536; otherwise, the method proceeds to step 526.

In at least one embodiment of the present disclosure, all variable pairs in the branch are retrieved at step 526. A check is made to ensure all pairs are processed, at step 528. The method 500 then proceeds to step 532 where a check is made to see if there is direct inheritance.

In at least one embodiment of the present disclosure, the method 500 then proceeds to step 536 where all tree elements are loaded, and checked at step 538 to see if all elements have been processed. If there are any warnings, they are output at step 542. At step 544, a check is made to confirm if an element is a placeholder within multiple embedding, and if so, the method proceeds to step 546, where any warnings are output.

It will be appreciated that for every placeholder in the tree, a warning is output if the placeholder is integrating into several integration points. It will be further appreciated that it usually leads to the tree where one branch is connected to several nodes and possibly turns the tree into a graph.

While this disclosure has been described as having various embodiments, these embodiments according to the present disclosure can be further modified within the scope and spirit of this disclosure. This application is therefore intended to cover any variations, uses, or adaptations of the disclosure using its general principles. For example, any methods disclosed herein represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

What is claimed is:

1. A method for analysis of navigation schema, comprising:
   receiving a transformation request to transform a hierarchical navigation schema to a plain schema;
   in response to receiving the transformation request, receiving a navigation schema;
   initializing a plurality of navigation elements, the each of the navigation elements having a variable context associated therewith;
   saving the each of the variable context for each of the plurality of navigation elements to a map;
   moving the each of the plurality of navigation elements to a plain navigation schema; and
   integrating the each of the plurality of navigation elements to a root placeholder.

2. The method of claim 1, further comprising the step of placing the context variables of the each of the plurality of navigation elements in the plain navigation schema.

3. The method of claim 1, further comprising the step of checking if the map is empty.

4. The method of claim 1, further comprising:
   creating an empty navigation schema; showing an available list of platform placeholders;
   inserting schema templates into the empty navigation schema to create a generated schema; and
   analyzing the generated schema.

5. The method of claim 4, wherein creating the generated schema further comprises:
   inserting at least one level menu;
   inserting at least a view or wizard corresponding to the at least one level menu; and
   requesting labels and constructing variables for the each of the variable context.

6. The method of claim 5, further comprising the step of publishing the connector package to a service database.

7. A method of generation of a navigation schema, the method comprising:
   receiving a transformation request to transform a hierarchical navigation schema to a plain schema;
   creating, at a navigation schema analyzer, an empty navigation schema, using a navigation object model;
   retrieving a corresponding schema template from a template library and inserting the corresponding schema template into the empty navigation schema;
   generating, at the navigation schema analyzer, a generated schema comprising at least one navigation element selected from a group consisting of a menu level, a view, a wizard, and a label;
   analyzing, at the navigation schema analyzer, the generated schema; and
   completing, at the navigation schema analyzer, a connector package based at least in part on the generated schema, and publishing the connector package to a service database.

8. The method of claim 7 wherein the at least one navigation further comprises at least one variable for the each at least one navigation element selected.

* * * * *